Jan. 13, 1970    YOICHI MORI ET AL    3,489,037
AUTOMATIC SPEED CHANGE DEVICE FOR VEHICLES
Filed July 18, 1967    8 Sheets-Sheet 1

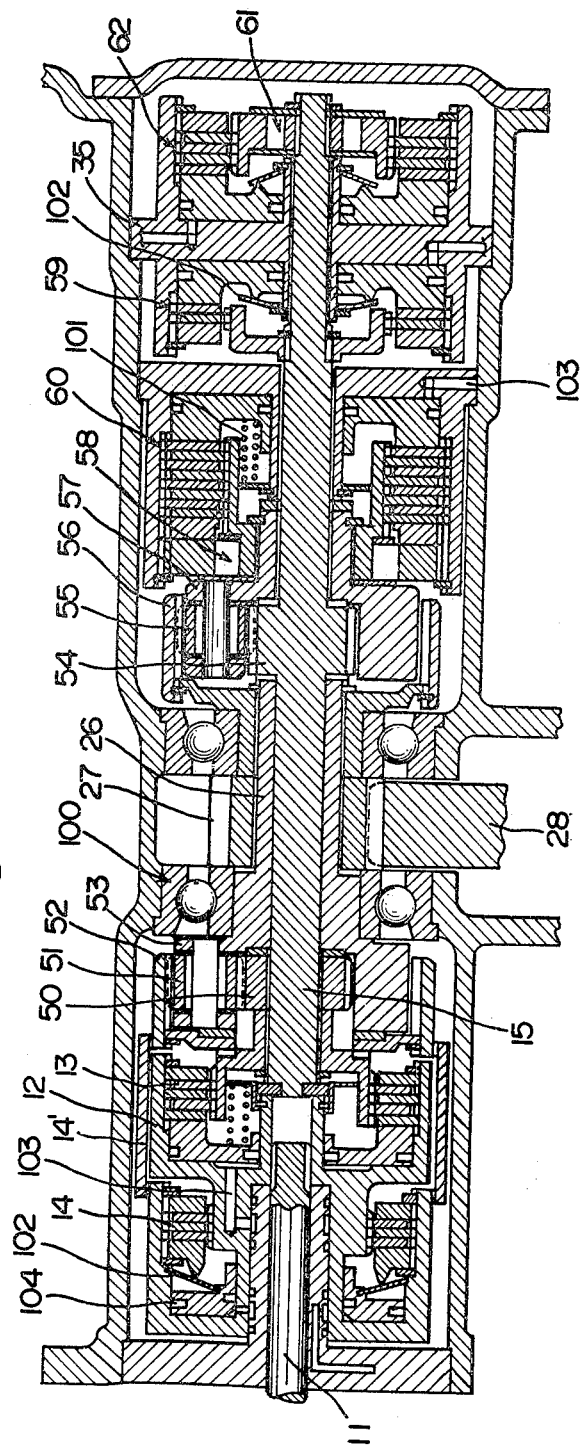

United States Patent Office 3,489,037
Patented Jan. 13, 1970

3,489,037
AUTOMATIC SPEED CHANGE DEVICE FOR VEHICLES
Yoichi Mori, Nagayuki Marumo, Noburu Fukazawa, and Koichi Ohie, Yokohama, Japan, assignors to Nissan Jidosha Kabushiki Kaisha, Yokohama, Japan
Filed July 18, 1967, Ser. No. 654,231
Claims priority, application Japan, July 30, 1966, 41/49,650, 41/49,649; Sept. 27, 1966, 41/63,386
Int. Cl. F16h 37/08
U.S. Cl. 74—695      5 Claims

ABSTRACT OF THE DISCLOSURE

A speed change device for vehicles comprising a torque converter connected to an engine crankshaft, a clutch means, a planetary gear assembly means selectively connectable to said torque converter through said clutch means, a brake and one-way brake means selectively engageable with said planetary gear assembly means, an output gear located at a point corresponding to the longitudinal middle point of said crankshaft, wherein axes of said clutch means, said planetary gear assembly means, said brake and one-way brake means, and said output gear are in alignment with a common axis which is parallel with the axis of said crankshaft.

---

This invention relates to an automatic speed change device for vehicles, more particularly to a speed change device for vehicles comprising a torque converter connected to an engine crankshaft, a clutch means, a planetary gear assembly means selectively connectable to said torque converter through said clutch means, a brake and one-way brake means selectively engageable with said planetary gear assembly means, and an output gear located at a point corresponding substantially to the longitudinal middle point of said crankshaft, wherein axes of said clutch means, said planetary gear assembly means, said brake and one-way brake means, and said output gear are in alignment with a common axis which is parallel with the axis of said crankshaft.

At the present, the most commonly used layout of power transmission mechanism in a vehicle is the so-called front-engine rear-drive type, in which the engine for driving the vehicle is placed in the proximity of the front axle of the vehicle and the speed change device is positioned directly behind the engine, so that the engine power is transmitted to the rear wheels through a propeller shaft, a differential gear means, and rear axles. In the front-engine rear-drive type layout, the propeller shaft is indispensable.

In order to eliminate the need of such propeller shaft, it has been proposed and practiced to some extent to use the so-called front-engine front-drive type or rear-engine rear-drive type layout. However, when the propeller shaft is eliminated by using the latter type layout, the overall set up of the vehicle driving mechanism becomes complicated, because a number of driving and power transmitting devices, such as the engine, the speed change device, the differential gear means, drive axles, etc., have to be arranged effectively in a limited space. In order to achieve the smooth operation of the vehicle, it is necessary to place the differential gear means at about the middle point between the drive wheels on both sides of the vehicle or about the middle point of the drive axle leading to the drive wheels. With conventional speed change devices for a front-engine front-drive type or rear-engine rear-drive type vehicle, it has been difficult to place the differential gear means at the middle point of the drive axle to ensure smooth operation of the vehicle.

The principal object of the present invention is to obviate such difficulty of the last mentioned conventional speed change devices by providing a novel speed change device which is adapted to produce output power at a point corresponding to the longitudinal middle point of the driving engine.

With the speed change device according to the present invention, it is possible to mount the driving engine laterally to the travelling direction of the vehicle or placing the axis of the crankshaft of the engine at right angles to the travelling direction of the vehicle.

The most salient feature of the speed change device of the present invention is in the fact that the device can be so fitted in the power transmission system of the vehicle that the differential gear means can be readily placed at the middle point of the drive axle.

According to the present invention there is provided an automatic speed change device which comprises a torque converter connected to one end of the crankshaft of an engine, a first and a second clutch driven by said torque converter, a planetary gear assembly means selectively engageable with said first and second clutches, said planetary gear assembly having elementary gears including at least a sun gear, a plurality of planet gears, an internal gear, and a carrier supporting said planet gears, brake and one-way brake means to automatically stop said elementary gears of the planetary gear assembly means in a selective manner, and an output gear to be driven by said planetary gear assembly means, axes of rotation of said clutches, said planetary gear assembly means, said brake and one-way brake means, and said output gear being in alignment with a common axis which is parallel with the axis of said crankshaft of the engine, said output gear being located at a position on said common axis which corresponds substantially to the longitudinal middle point of the crankshaft.

The advantages of the speed change device according to the present invention will be summarized as follows:

(1) The output power from the speed change device can be obtained at about the middle point of the axis of an engine crankshaft, which drives the speed change device. Accordingly, if the engine and the speed change device are mounted laterally on a vehicle, it is ensured that a differential gear means can be positioned at about the middle point of both side drive wheels of a vehicle or at about the middle point of the drive axle leading to the drive wheels.

(2) The construction of the speed change device itself is very simple, because a comparatively small number of gears are involved therein. With the speed change device of the invention, the propeller shaft of the conventional power transmission system of a vehicle can be eliminated.

(3) With the use of one-way brake means, the shift from one operative stage to another operative stage of the speed change device can be carried out smoothly.

(4) Throughout the forward stages of operation, the first clutch is kept engaged, and hence, even though minor switch-over of the brake means and the clutch means takes place, the major connection from the power input members to the planetary gear assembly is kept unchanged. Thus, the smooth operation of the vehicle can be ensured.

(5) The power output member is not switched over throughout the entire stages of operation, so that the structure of the overall transmission system is very simple.

(6) During idling, the speed change device can be held at the so-called "clean neutral" position, or the power transmission from the engine to the planetary gear assembly means is completely interrupted at the clutch means.

Accordingly, mechanical noise during the idling of the speed change device can be minimized.

(7) Identical mechanical parts can be used at different portions of the speed change device, when two units of simple planetary gear assemblies are used therein. Thereby, the manufacturing cost of the speed change device can be reduced.

(8) The particular mechanical structure of the device allows the designer to select speed change ratios at will for each operative stage, so that the optimum speed change ratios can be easily provided throughout the entire operative stages. Thus, the efficiency of the speed change device can be improved and the mechanical loading to the component gears can be reduced.

For a better understanding of the invention, reference is made on accompanying drawings, in which:

FIG. 15 is a schematic sectional view of an arrangement of various parts of the fourth embodiment of the speed change device according to the present invention.

The same reference numerals and the same symbols represent the corresponding parts of the speed change device throughout the drawings.

Figure 1:
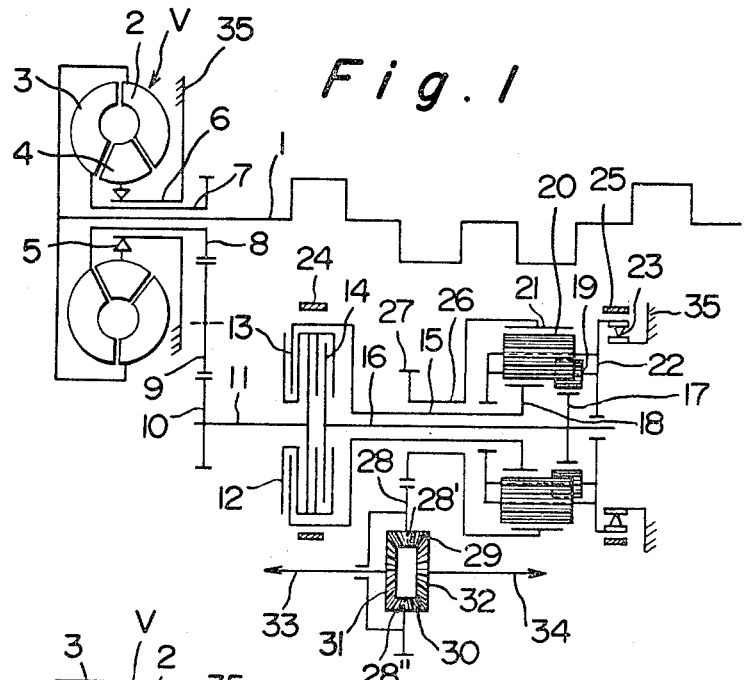
FIG. 1 is a simplified skeleton diagram of the first embodiment of the automatic speed change device according to the present invention.

The first embodiment of the automatic speed change device according to the present invention will now be described referring to FIG. 1. In the figure, an engine crankshaft 1 is shown as that of a piston engine, but it can be a driving shaft of a non-piston engine, such as a rotary engine. A torque converter V directly connected to one end of the engine crankshaft 1 comprises a pump 2 secured to the crankshaft 1, turbine 3, a stator 4, and a one-way brake 5. The one-way brake 5 is mounted on a sleeve 6, which is integral with the casing 35 of the speed change device. A series of transmission gears 8 to 10 are provided between the torque converter V and an input shaft 11, in which the gear 8 is driven by the turbine 3 through a hollow shaft 7, while the gear 9 acts to transfer the rotation of the gear 8 to the gear 10 secured to the input shaft 11. The one-way brake 5 is adapted to allow the rotation of the stator 4 only in the normal direction, but not in the opposite direction. What is meant by the normal direction is that direction in which the crankshaft 1 and the pump 2 rotate.

Figure 5:
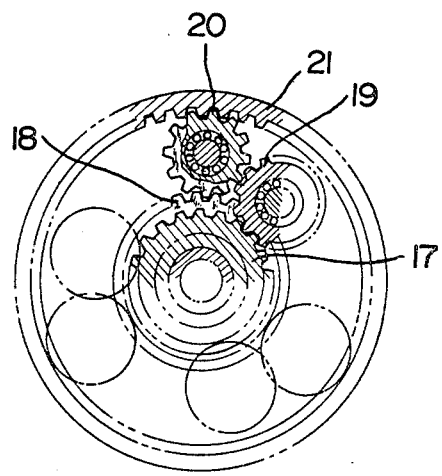
FIG. 5 is a diagrammatic illustration of the manner in which various elementary gears in the planetary gear assembly usable in the first embodiment of the speed change device are related with each other.

The speed change device according to the present invention includes frictional and gearing elements depicted by reference numerals 11 to 34. A clutch body 12, which is common to both a first and a second clutch, is integral with the input shaft 11, and first clutch plate 14 and a second clutch plate 13 are selectively engageable with the common clutch body 12. The first clutch plate 14 is connected to a transmission shaft 16, while the second clutch plate 13 is secured to another hollow shaft 15 adapted to rotate around the transmission shaft 16 in a sliding manner. Connected to the shafts 15 and 16 is a Ravigneaux type planetary gear assembly having a first sun gear 17 connected to the shaft 16, a second sun gear 18 connected to the hollow shaft 15, first planet gears 19, second planet gears 20, an internal gear 21 and a carrier 22 supporting the first and second planet gears 19 and 20 in a rotatable manner. What is meant by the Ravigneaux-type planetary gear assembly, for instance, is an assembly as disclosed in the U.S. Patent No. 2,239,973, granted to Pol Ravigneaux on Apr. 29, 1941. FIG. 5 shows an example of such planetary gear assembly usable in the speed change device according to the present invention, in which the first sun gear 17 is meshed with first planet gears 19, the second sun gear 18 is meshed with second planet gears 20, the second planet gears 20 are further meshed with both the first planet gears 19 and the internal gear 21, and the carrier 22 carries the first and second planet gears 19 and 20 in a rotatable manner around the axis of the assembly and around the axes of the planet gears.

There is provided another one-way brake 23, which allows rotation of the carrier 22 only in the aforesaid normal direction. When the carrier 22 tends to rotate in a non-normal direction, the one-way brake 23 is actuated to stop the carrier 22 against such tendency. A brake 24 acts to stop the rotation of the hollow shaft 15 and accordingly rotation of the second sun gear 18, and another brake 25 acts to stop the carrier 22, when they are actuated. An output pinion 27 is connected to the internal gear 21 through another hollow shaft 26, which is adapted to rotate around the hollow shaft 15.

A reducing gear wheel 28 is driven by the output pinion 27 so as to actuate a differential gear means consisting of gears 29 to 32. Drive axles 33 and 34 are rotated by the differential gear means to turn the drive wheels (not shown) located at both sides of a vehicle. Generally speaking, in the case of front-drive type layout, the drive axles 33 and 34 are connected to drive wheels through universal joints respectively, while in the case of rear-drive type layout, the drive axles 33 and 34 are directly connected to the drive wheels at both sides of the vehicle. The differential gear means comprises a pair of bevel pinions 29 and 30 carried by pins 28' and 28" mounted on the reducing gear wheel 28, and a pair of side gears 31 and 32 coupled with both side drive axles 33 and 34 respectively. The side gears 31 and 32 are driven by the bevel gears 29 and 30, and under differential operative conditions, one side gear, e.g. the gear 31, is rotated at a different speed from that of the other side gear, e.g. the gear 32.

It is important to note here that axes of rotation of the clutches 12, 13, and 12, 14, the planetary gear assembly, the brakes 24 and 25, the one-way brake 23, and the output pinion 27, should be aligned with a common axis, which is the shaft line of the shafts 11, 15, and 16. Moreover, this common axis is parallel with both the axis of the crankshaft 1 and axles 33 and 34.

With the speed change device of the aforesaid construction, when the engine crankshaft 1 is rotated by starting the engine, the engine power is transferred to the pump 2 of the torque converter V, and further to the turbine 3 by means of the fluid flowing through the torque converter V. The power on the turbine 3 is transmitted to the clutch body 12 common to both first and second clutches by means of the hollow shaft 7, the series of transmission gears 8 to 10, and the input shaft 11 to the clutch means. By actuating automatically each clutch and each brake by a suitable hydraulic mechanism (not shown), the revolving speed of the internal gear 21 of the planetary gear assembly and the output pinion 27 coupled thereto can be changed in three forward stages and one rearward stage. The power on the output pinion 27 is transmitted to the reducing gear wheel 28 at a further reduced speed, and the power of thus reduced speed is delivered to the both side drive axles 33 and 34 through the differential gear means 29 to 32.

Prior to entering into the detailed explanation of the operative conditions of each clutch, each brake, power transmission routes, and speed change ratios for each operative stage of the speed change device, description will be made on the relations between revolving speeds of various rotary members of the device, which are necessary for determination of the speed change ratios for each operative stage. Let it be assumed that the revolving speeds of the first sun gear 17, the second sun gear 18, the internal gear 21, and the carrier 22 are represented by $S_1$, $S_2$, R, and C, respectively. Then, there are following relations among such revolving speeds.

$$C(l_R - 1) = l_R R - S_1 \quad (\alpha)$$

$$C(l_S + 1) = l_S S_2 + S_1 \quad (\beta)$$

Here, $$l_R = \frac{\text{(pitch circle radius of the internal gear 21)}}{\text{(pitch circle radius of the first sun gear 17)}}$$

$$l_S = \frac{\text{(pitch circle radius of the second sun gear 18)}}{\text{(pitch circle radius of the first sun gear 17)}}$$

As will be described in detail hereinafter, in the case of forward operation of the speed change device, the power on the turbine 3 is delivered to the first sun gear 17 because the first clutch 12, 14 is engaged, while in the case of the rearward operation, the power on the turbine 3 is transferred to the second sun gear 18 as the second clutch 12, 13 is engaged. Accordingly, the speed change ratio for the forward operation is defined by the quotient of $S_1/R$, and that for the rearward operation is defined by the quotient of $S_2/R$.

If it is further assumed that the pitch circle radii of the transmission gears 8 and 10 are the same, then the revolving speed $S_1$ or $S_2$ becomes identical with that of the turbine 3. The output pinion 27 and the internal gear 21 are rotated always at the same speed, because they are bonded together. Hence, the speed change ratios given by $S_1/R$ and $S_2/R$ also represent the speed change ratios between the turbine 3 and the output pinion 27 under the aforesaid assumptions.

The speed change ratios for each operative stage can be determined by substituting zero to that revolving speed in the Formulae $\alpha$ and $\beta$ which represents a rotary member that is held stationary in the particular stage of operation.

The operation of the speed change device in each operative stage will now be described. In the following description, it is assumed, for the sake of numerical examples, that $l_R = 2.40$ and $l_S = 1.14$.

NEUTRAL STAGE

Both the first and second clutches are released. In this case, the common clutch body idles, and the power on the turbine is not transmitted to any rotary member further than the clutch body 12.

FORWARD FIRST STAGE

The first clutch 12, 14 is engaged. In this case, the power on the turbine 3 is delievered to the first sun gear 17, and the carrier 22 tends to be rotated in the non-normal direction by the frictional force between the drive wheels (not shown) and the road surface (not shown), but the one-way brake 23 acts to hold the carrier 22 stationary against such tendency. By substituting the relation of $C = 0$ to the Formula $\alpha$, the speed change ratio $m$ for the forward first stage can be determined as follows.

$$m = S_1/R = l_R = 2.40$$

In other words, the output pinion 27 rotates at a speed lower than that of the first sun gear 17. The revolving speed of the first sun gear 17 is the same as that of the turbine 3 in this embodiment. The power on the output pinion 27 is delievered to the reducing gear wheel 28 at a reduced speed, and then further to the driving wheels (not shown) at both sides of the vehicle through the differential gear means connected to the drive axles 33 and 34.

FORWARD SECORND STAGE

The first clutch 12, 14 is engaged and at the same time the brake 24 is actuated. Under these conditions, the power on the turbine 3 is transmitted to the first sun gear 17 as in the case of the forward first stage, while the second sun gear 18 is held stationary by means of the brake 24. By substituting the relation of $S_2 = 0$ to the Formulae $\alpha$ and $\beta$, the speed change ratio $m$ for this operative stage can be determined as follows.

$$m = S_1/R = \frac{l_R(l_S + 1)}{l_R + l_S} = 1.45$$

Since the transmission route of power from the output pinion 27 to the drive wheels (not shown) is identical to that in the case of the forward first stage operation, it will not be repeated in the description of the forward second and succeeding operative stages.

FORWARD THIRD STAGE

Both the first clutch 12, 14 and the second clutch 12, 13 are engaged simultaneously, while no brake is actuated. Under such conditions, the power on the turbine 3 is transmitted to both the first and the second sun gears 17 and 18 simultaneously, and hence, both sun gears rotate at the same revolving speed.

By substituting the conditions $S_1 = S_2$ to the Formulae $\alpha$ and $\beta$, the speed change ratio $m$ for the forward third third stage can be determined as follows.

$$m = S_2/R = S_1/R = 1$$

In other words, the entire planetary gear assembly and the output pinion 27 rotate as an integral body at a common revolving speed.

REARWARD STAGE

The second clutch 12, 13 is engaged, while the brake 25 is actuated. Under these conditions, the power on the turbine 3 is delivered to the second sun gear 18 through thus engaged clutch 12, 13 and the hollow shaft 15. By substituting the relation of $C = 0$ to the Formulae $\alpha$ and $\beta$, the speed change ratio for this operative stage can be determined as follows.

$$m = S_2/R = -l_R/l_S = -2.10$$

In other words, the output pinion 27 rotates in a reverse direction at a reduced speed.

The operative conditions of each clutch and brake in the aforesaid operative stages of the speed change device are shown in Table I.

TABLE I

| Operative stage | Forward 1st stage | Forward 2d stage | Forward 3d stage | Rearward stage |
|---|---|---|---|---|
| First clutch (12, 14) | Engaged | Engaged | Engaged | Disengaged. |
| Second clutch (12, 13) | Disengaged | Disengaged | Engaged | Engaged. |
| Brake (24) | Not actuated | Actuated | Not actuated | Not actuated. |
| Brake (25) | (Actuated) | Not actuated | do | Actuated. |
| One-way brake (23) | Actuated | do | do | Not actuated. |
| Speed Change ratio ($m$): | | | | |
| Formula | $l_R$ | $l_R(l_S+1)/l_R+l_S$ | 1 | $-l_R/l_S$. |
| Example: $l_R = 2.40$, $l_S = 1.14$ | 2.40 | 1.45 | 1 | −2.10. |

Note: In Table I, the reason for parenthesizing the "actuated" condition of the brake 25 in the forward first stage is as follows. When engine braking is applied, for instance for the purpose of controlling the travelling speed of a vehicle while descending along a slope, there is produced such a torque on the output pinion which tends to accelerate rotation of the carrier 22 in the normal direction. Since the one-way brake 23 is not effective in hindering the rotation of the carrier in the normal direction, in order to make the engine brake effective, it is preferable to actuate the brake 25 to withhold the carrier 22 securely.

Thus, the desired engine braking can be applied while maintaining the first speed change ratio.

Figure 2:
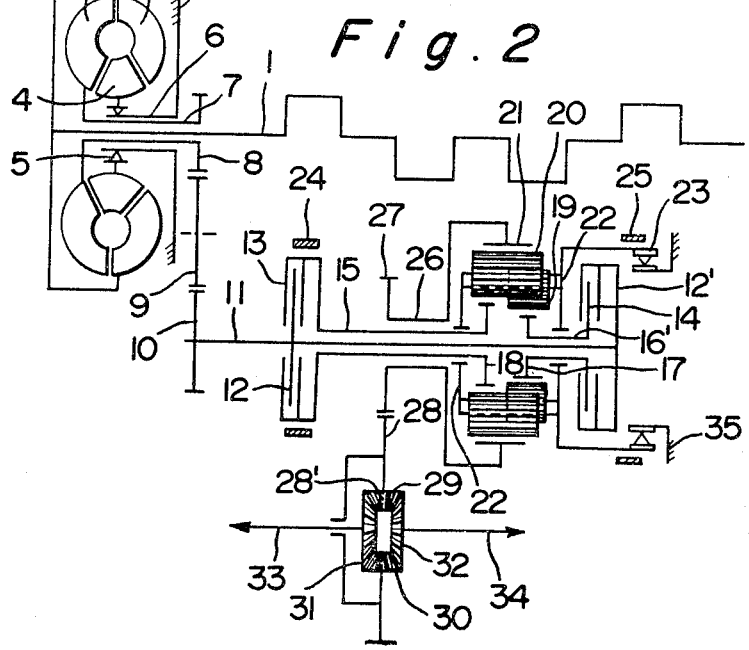
FIGS. 2 to 4 are views similar to FIG. 1, illustrating different modifications of the first embodiment.

FIG. 2 illustrates a modification of the speed change device as shown in FIG. 1, in which a first clutch 12′, 14 and a second clutch 12, 13 are separated and located at opposite sides of the planetary gear assembly. The operative principles of the speed change device of FIG. 2 are identical with those of FIG. 1, and hence, the conditions of Table I are also applicable to this modification. The advantage of this modification is in the fact that the torque converter V can be connected to the right hand end of the crankshaft 1, as viewed in FIG. 2, so that the driving torque can be delivered to the planetary gear assembly from the right hand end of the input shaft 11, even though the example of FIG. 2 has a torque converter connected to the extreme left end of the crankshaft 1. In this modification, a transmission shaft 16′, which corresponds to the shaft 16 of the preceding embodiment, should be hollow.

Figure 3:
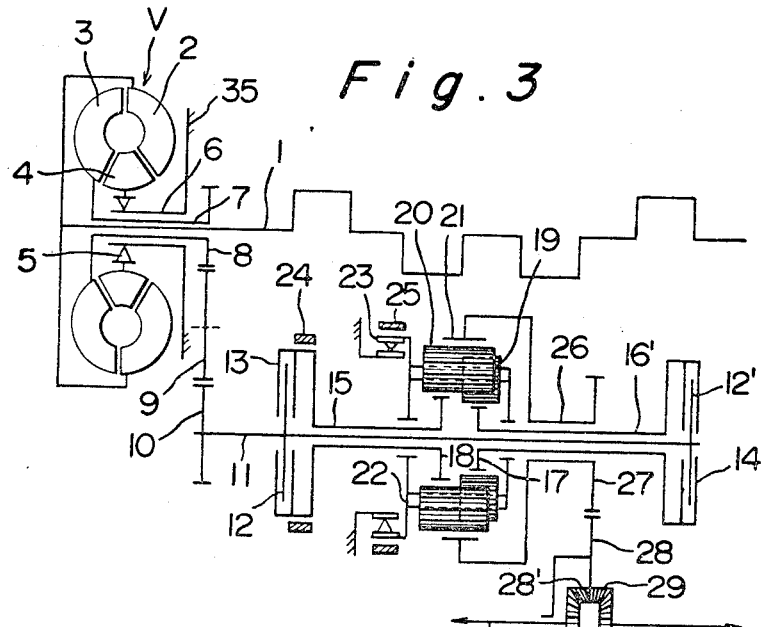

FIG. 3 shows a further modification of the speed change device as shown in FIG. 2, in which the combination of a one-way brake 23, brakes 24 and 25 is arranged between a second clutch 12, 13 and a planetary gear assembly, while an output pinion 27 is disposed between the planetary gear assembly and a first clutch 12′, 14. The conditions of Table I are also applicable to this embodiment. The advantage of this modification is also in the fact that the driving torque from the engine crankshaft 1 can be transmitted to the planetary gear assembly through either left hand end or the right hand end of the input shaft 11.

Figure 4:
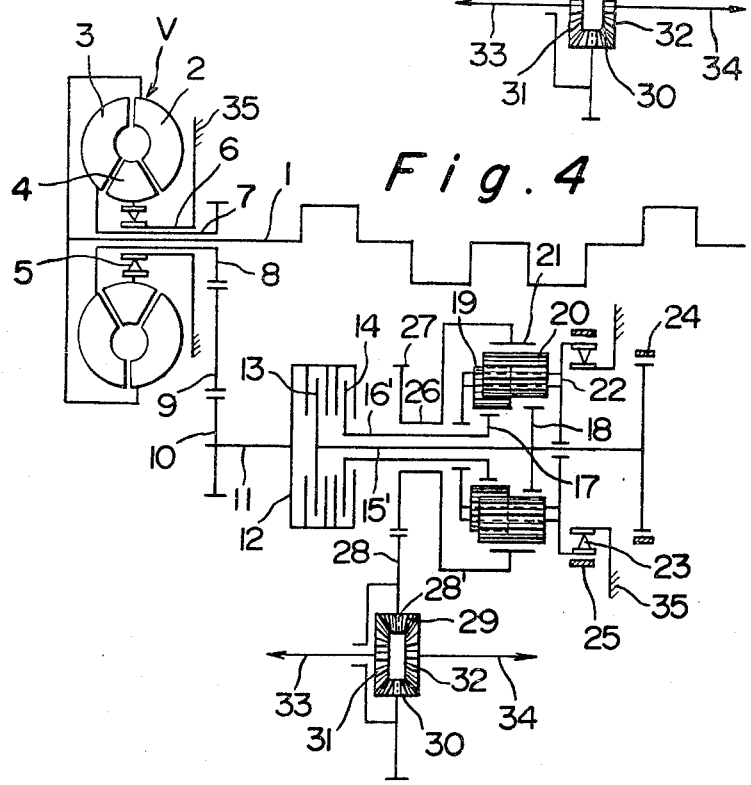

FIG. 4 shows a modification of the speed change device as depicted in FIG. 1, in which the relative positions between first and the second sun gears are interchanged and a brake 24 associated with the second sun gear 18 is positioned at the extreme right end of the speed change device. In this modification, a shaft 15′, which corresponds to the hollow shaft 15 of FIG. 1, can be made solid. The operative conditions of Table I are also applicable to this modification. The advantage of the modification as illustrated in FIG. 4 is in the fact that frictional elements including brakes 24 and 25 and a one-way brake 23 are concentrated at the right hand end of the input shaft 11.

As described in the foregoing referring to FIGS. 1 to 5, in the first embodiment of the speed change device according to the present invention, the output power is transmitted to the drive axles 33, 34 disposed in parallel with the common axis, which is common to the planetary gear assembly, clutches and brakes. Furthermore, the aforesaid common axis and the drive axles are both arranged in parallel with the axis of the crankshaft 1. In other words, the power system to drive wheels in this vehicle comprises three parallel axes, namely those of the crankshaft, the gears of the speed change device, and the drive axles. Such arrangement of power system is particularly advantageous for the aforesaid lateral layout of the engine in a front-engine front-drive type vehicle or a rear-engine rear-drive type vehicle. In this first embodiment of the invention, a pair of clutches 12, 13 and 12, 14 are inserted respectively between the input shaft 11 and the first sun gear 17 and between the input shaft 11 and the second sun gear 18, while the output pinion 27 is disposed either between the pair of clutches and the planetary gear assembly or between one of the pair of clutches and the planetary gear assembly. Here, the position of the output pinion 27 corresponds to the longitudinal middle point of the crankshaft 1. With the output pinion 27 thus disposed at an intermediate position among mechanical elements of the speed change device according to the present invention, a differential gear means comprising gears 28, 29, 30, 31, and 32 can be placed at about the middle of the wheels (not shown) on both sides of the vehicle. Accordingly, both side drive axles 33 and 34 can be made in about the same length.

With the modifications shown in FIGS. 2 to 4, this embodiment of the speed change device can be mounted on various kinds of vehicles which have a variety of requirements on dimensions and layout of the structural components of the speed change device due to particular body and engine construction of the vehicles. Thus, most suitable layout of the power transmission can be achieved in vehicles of various construction.

In the preceding examples, the planetary gear assembly had two sun gears and an internal gear. The present invention, however, is not limited to such planetary gear assembly only.

Figure 6:
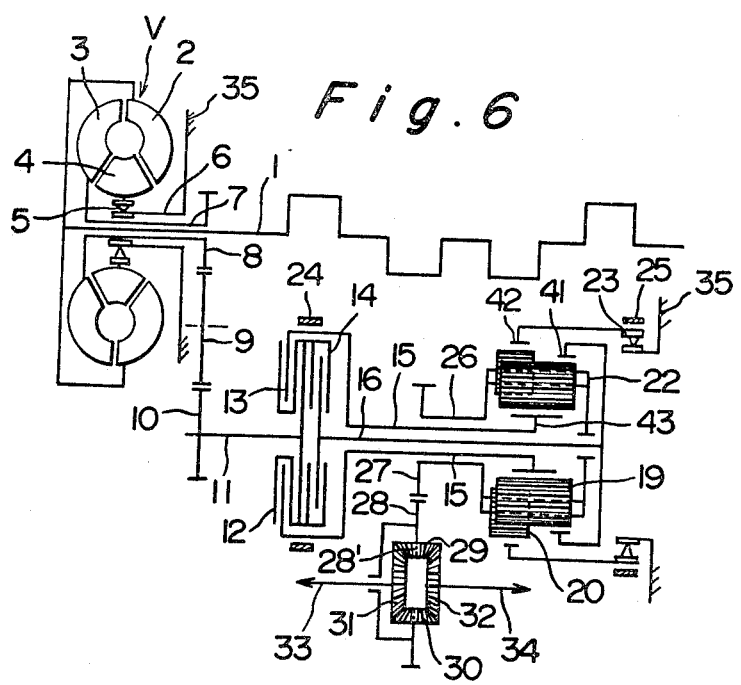
FIG. 6 is a simplified schematic skeleton diagram of the second embodiment of the automatic speed change device according to the present invention.

FIG. 6 shows a second type embodiment of the present invention, which is essentially of the same structure as the first embodiment as described hereinbefore referring to FIGS. 1 to 5, except that the structure of the planetary gear assembly and the mechanical connections related thereto are modified. The input portion of the second embodiment, which transmits power from an engine crankshaft 1 to an input shaft 11 connected to clutches, is identical with that of the first embodiment, and hence, the details of the structure and the operation of the input portion will not be repeated here.

Figure 10:
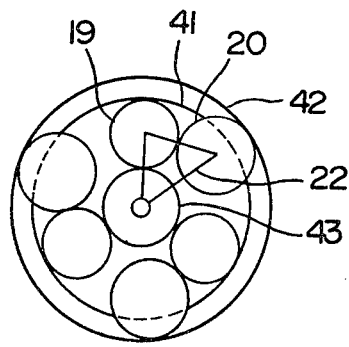
FIG. 10 is a diagrammatic illustration similar to FIG. 5, showing the manner in which various elementary gears of a planetary gear assembly usable in the second embodiment as shown in FIGS. 6 to 9 are related with each other.

A modified Ravigneaux type planetary gear assembly, as will be described hereinafter, is used in the second embodiment. As shown in FIG. 6, the planetary gear assembly comprises a first internal gear 41, a second internal gear 42, first planet gears 19, second planet gears 20, a sun gear 43, and a carrier 22 supporting the planet gears 19 and 20 in a rotatable manner. Let it be assumed that in the modified Ravigneaux type planetary gear assembly, the elementary gears are meshed with each other as shown in FIG. 10; namely, the first internal gear 41 is meshed with the first planet gears 19, and the second internal gear 42 is meshed with the second planet gears 20, while the first planet gears 19 are meshed with both the sun gear 43 and the second planet gears 20, wherein the first and the second planet gears are rotatably supported by the carrier 22 at certain geometrical relations between each other.

The sun gear 43 of the modified Ravigneaux type planetary gear assembly is connected to the input shaft 11 through a hollow shaft 15 connected to a second clutch 12, 13, while the first internal gear 41 is bonded to a transmission shaft 16 connected to a first clutch 12, 14. The construction and operation of the first and the second clutches and the shafts between the clutches and the planetary gear assembly are the same as the corresponding clutches and shafts of the first embodiment, hence, no detailed explanation thereof will be repeated here. A one-way brake 23 is mounted on the casing 35 of the device so as to support the second internal gear 42 in such a manner that the second internal gear 42 can be rotated in the normal direction but not in the opposite direction.

The brake 24 acts to hold the hollow shaft 15 and accordingly the sun gear 43 when it is actuated, while the brake 25 acts to hold the second internal gear 42 stationary when it is actuated. An output pinion 27 is connected to the carrier 22 through a hollow shaft 26 so as to be rotated as an integral body therewith. The hollow shaft 26 is adapted to revolve around the hollow shaft 15.

The construction and the operation of the power transmission route subsequent to the reducing gear wheel 28, which is meshed with the output pinion 27, are the same as those of the first embodiment as described hereinbefore referring to FIGS. 1 to 4.

With the speed change device of the aforesaid construction, when the engine crankshaft 1 is driven by starting the engine, the power is transmitted to the turbine 3 of the torque converter V through the pump 2 and the fluid flowing within torque converter V, and the power on the turbine 3 is further delivered to the common clutch body 12 of the first and second clutches through the hollow shaft 7 connected to the series of transmission gears 8 to 10 and the input shaft 11 of the speed changing means. By controlling automatically the operative conditions of the clutches and the brakes with a suitable hydraulic means (not shown), the revolving speed of both the carrier 22 of the planetary gear assembly and the output pinion 27 can be changed in three stages in forward direction and in one stage in the rearward direction. Thus changed revolving speed of the output pinion 27 is further reduced by the reducing gear wheel 28 and the power is delivered to the drive axles 33 and 34 at both sides of the vehicle through said gear wheel and the differential gear means.

Prior to entering the detailed description of the operation of each clutch and brake, the power transmission routes, and speed change ratios for each operative stage of the speed change device, the relations between revolving speeds of various gear members of the device will now be described. Assuming that the revolving speeds of the sun gear 43, the first internal gear 41, the second internal gear 42 and the carrier 22 are represented by $S$, $R_1$, $R_2$, and $C$ respectively, then there are following relations among such revolving speeds.

$$C(l_1+1) = l_1 R_1 + S \qquad (\alpha)'$$

$$C(l_2-1) = l_2 R_2 - S \qquad (\beta)'$$

Here, $$l_1 = \frac{\text{(pitch circle radius of the first internal gear 41)}}{\text{(pitch circle radius of the sun gear 43)}}$$

$$l_2 = \frac{\text{(pitch circle radius of the second internal gear 42)}}{\text{(pitch circle radius of the sun gear 43)}}$$

As will be described hereinafter, in the case of forward operation, the forward clutch 12, 14 is engaged, and the power on the turbine 3 is transmitted to the first internal gear 41 through the transmission shaft 16, while in the case of the rearward operation, the rearward clutch 12, 13 is engaged so that the power is delivered to the sun gear 43 through the hollow shaft 15. Accordingly, the speed change ratio can be designated by $R_1/C$ in the case of the forward operation, and $S/C$ in the case of the rearward operation. If it is assumed here that the pitch circle radii of the transmission gears 8 and 10 are the same, then the revolving speed $R_1$ or $S$ becomes identical with the revolving speed of the turbine 3. Since the revolving speed of the output pinion 27 is identical with that of the carrier 22, each of the aforesaid speed change ratios $R_1/C$ and $S/C$ becomes the speed change ratio between the turbine 3 and the output pinion 27. The speed change ratios for each operative stage can be determined by substituting zero to the revolving speed in the Formulae $(\alpha)'$ and $(\beta)'$ which represents a rotary member that is held stationary in the particular stage of operation.

Each operative stage of the speed change device will now be described in detail. In the numerical examples in the following description it is assumed that $l_1=2.4$ and $l_2=3.2$.

NEUTRAL STAGE

Both the first and the second clutches are disengaged. Under these conditions, the clutch body 12 idles, and the power is not transmitted any further.

FORWARD FIRST STAGE

The first clutch 12, 14 is engaged. In this case, the power on the turbine 3 is transmitted to the first internal gear 41. The second internal gear 42 tends to be turned in non-normal direction by the friction between the drive wheel and the road surface, but the one-way brake 23 acts to held the second internal gear 42 stationary against such tendency due to the frictional force. By substituting the relation of $R_2=0$ to the Formulae $(\alpha)'$ and $(\beta)'$, the speed change ratio $m$ for this operative stage can be determined as follows.

$$m = R_1/C = (l_1+l_2)/l_1 = 2.33$$

In other words, the output pinion 27 rotates at a speed lower than that of the first internal gear 41 or that of the turbine 3. The power on the output pinion 27 is deliver to both side axles 33 and 34 through the reducing gear wheel 28 so as to actuate the drive wheels (not shown) on both sides of the vehicle.

FORWARD SECOND STAGE

The first clutch 12, 14 is engaged, and at the same time the brake 24 is actuated. Under such conditions, the power on the turbine 3 is transmitted to the first internal gear 41 as in the case of forward first stage, and the sun gear 43 is held stationary by the brake 24. By substituting the relation of $S=0$ to the Formulae $(\alpha)'$, the speed change ratio $m$ for the forward second stage can be determined as follows.

$$m = R_1/C = (l_1+1)/l_1 = 1.42$$

In this stage, the output pinion 27 rotates also at a speed lower than that of the first internal gear 41. Since the power transmission route from the output pinion 27 to the drive wheels (not shown) is identical with that in the case of the forward first stage operation, it will not be repeated in the description of the forward second and the succeeding operative stages.

FORWARD THIRD STAGE

Both the first and the second clutches 12, 14 and 12, 13 are engaged simultaneously, but no brake is actuated. Under these conditions, the power on the turbine 3 is delivered simultaneously to both the sun gear 43 and the first internal gear 41. By substituting the relation of $S=R_1$ to the Formula $(\alpha)'$, the speed change ratio $m$ for this forward third stage is given by $$m = R_1/C = 1$$

In other words, the entire planetary gear assembly and the output pinion 27 revolve together as an integral body.

REARWARD STAGE

The second clutch 12, 13 is engaged, and the brake 25 is actuated. Under these condtions, the power on the turbine 3 is delivered to the sun gear 43 through the rearward clutch 12, 13 and the hollow shaft 15, while the second internal gear 18 is held stationary by the brake 25. Therefore, by substituting the relation of $R_2=0$ to the Formula $(\beta)'$, the speed change ratio $m$ for this rearward stage can be given as follows.

$$m = S/C = -(l_2-1) = -2.2$$

In other words, the output pinion 27 is rotated in the reverse direction at a reduced speed.

The operative conditions and the speed change ratio in each operative stage of the speed change device as shown in FIG. 6 are summarized in Table II.

TABLE II

| Operative stage | Forward 1st stage | Forward 2d stage | Forward 3d stage | Rearward stage |
|---|---|---|---|---|
| First clutch (12, 14) | Engaged | Engaged | Engaged | Disengaged. |
| Second clutch (12, 13) | Disengaged | Disengaged | Engaged | Engaged. |
| Brake (24) | Not actuated | Actuated | Not actuated | Not actuated. |
| Brake (25) | (Actuated) | Not actuated | do | Actuated. |
| One-way brake (23) | Actuated | do | do | Not actuated. |
| Speed change ratio ($m$): | | | | |
| Formula | $l_1+l_2/l_1$ | $l_1+1/l_1$ | 1 | $-(l_2-1)$. |
| Example: $l_1=2.4$, $l_2=3.2$ | 2.33 | 1.42 | 1 | −2.20. |

Note: In Table II, the reason for parenthesizing the "actuated" condition of the brake 25 in the forward first stage is the same as what was described in detail in the note to Table I, provided that the carrier 22 in the note to Table I should be substituted by the second internal gear 42 in the case of the second embodiment as shown in FIG. 6.

Figure 7:
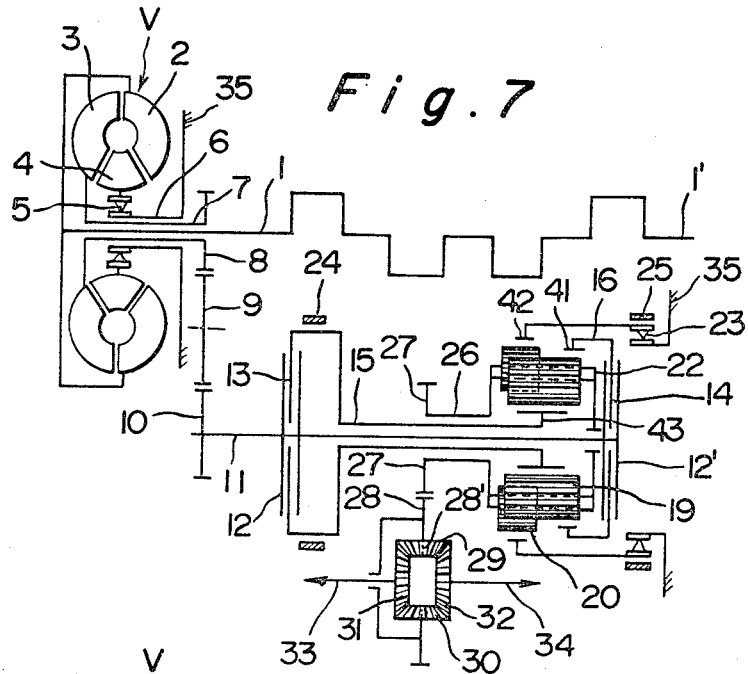
FIGS. 7 to 9 are skeleton diagrams, showing different modifications of the second embodiment.

A modification of the second embod'ment is shown in FIG. 7, in which the first clutch 12', 14 and a second clutch 12, 13 are not made in an integral mechanism but divided into two separate mechanisms and disposed at opposite ends of the planetary gear assembly, respectively. The operative principles of the speed change device of FIG. 7 are identical with those of the second embodiment as shown in FIG. 6, and hence, the conditions of Table II are also applicable to the modification of FIG. 7. The advantage of this embodiment is in the fact that the torque converter V can be connected to the right hand end of the crankshaft 1, as viewed in FIG. 7, so that the driving torque can be delivered to the planetary gear assembly from the right hand end of the input shaft 11, even though the example of FIG. 7 has a torque converter connected to the extreme left end of the crankshaft 1.

Figure 8:
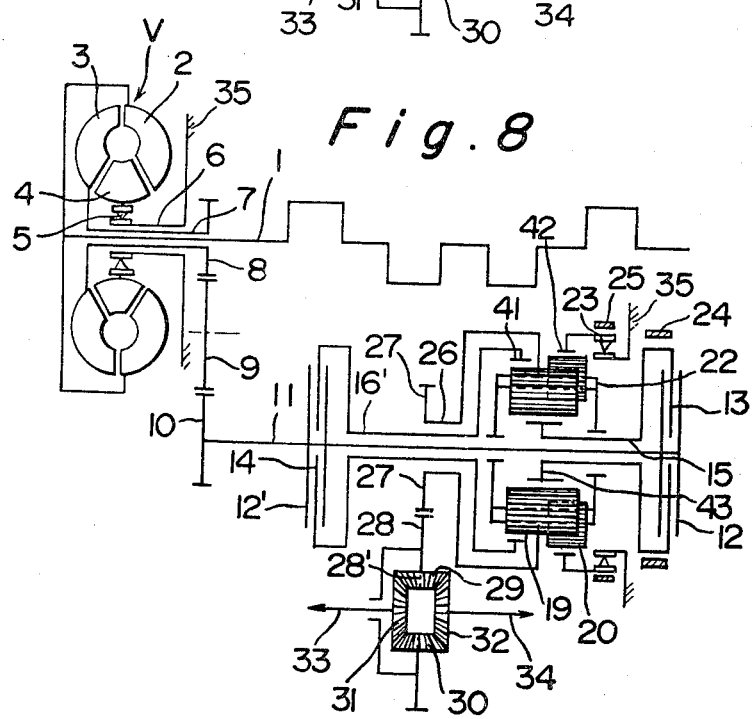

FIG. 8 shows another modification of the speed change device as shown in FIG. 7, in which modifications are made in that the positions of the first clutch 12', 14 and the second clutch 12, 13 are interchanged, that the position of the combination of the first planet gears 17 and the first internal gear 41 is interchanged with that of another combination of the second planet gears 20 and the second internal gear 42, that the brake element including a one-way brake 23, a brake 24, and a brake 25 are positioned between the second clutch 12, 13 and the planetary gear assembly, and that the output pinion 27 is disposed between the planetary gear assembly and the forward clutch 12', 14. The operative principles of this embodiment are identical with the second embodiment as shown in FIG. 6, and hence, the conditions of Table II are also applicable to this modification. The advantage of this modification is in the fact that the power can be delivered to the planetary gear assembly from the right hand end of the crankshaft, if so desired.

It should be noted that in this embodiment, a shaft 16', which corresponds to the solid shaft 16 of the second embodiment of FIG. 6, should be hollow.

Figure 9:
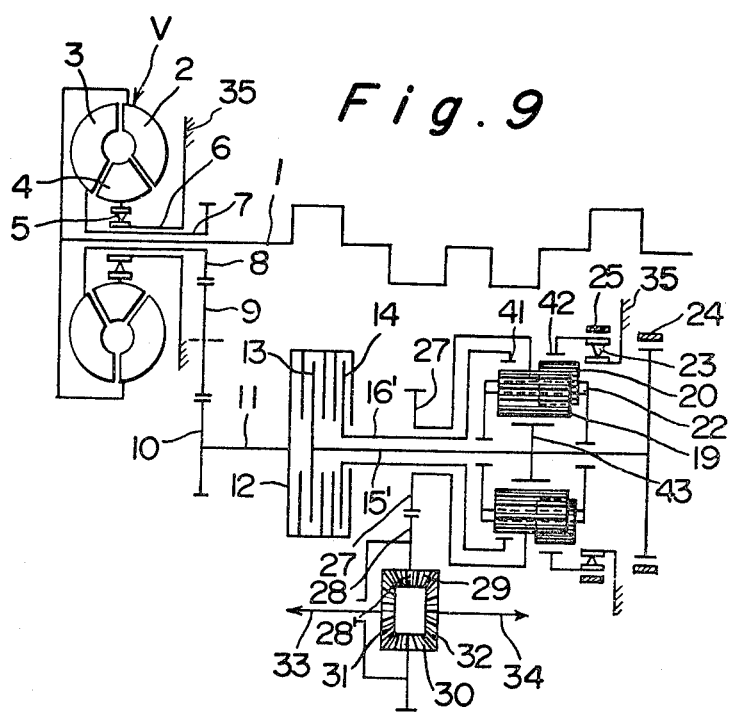

FIG. 9 shows a third modification of the second embodiment as shown in FIG. 6, in which a brake 24 for stopping rotation of a sun gear 43 is placed at the right hand end of the speed change device, as viewed in FIG. 9, so that frictional elements comprising the brake 24, a brake 25, and a one-way brake 23 are all concentrated at the right hand side of the speed change device.

As shown in the aforesaid second embodiment and the modifications, the output of the speed change device is ultimately transmitted to drive axles 33, 34, which are disposed in parallel with a common axis of rotation of the planetary gear assembly, clutches, and brakes. Moreover, both said common axis of rotation and the drive axles are arranged in parallel with the axis of the crankshaft 1. Such arrangement of the speed change device is advantageous for a vehicle having an engine disposed at right angles to the travelling direction of the vehicle. More particularly, the arrangement is useful for the aforesaid lateral layout of the engine in a front-engine front-drive type vehicle or a rear-engine rear-drive type vehicle.

As illustrated in FIGS. 6 to 9, in the second embodiment of the invention, a pair of clutches 12, 13 and 12, 14 are inserted between the input shaft 11 and the sun gear 43 and between the input shaft 11 and the first internal gear 41, respectively, while the output pinion 27 is disposed either between the pair of clutches and the planetary gear assembly or between one of the pair of the clutches are the planetary gear assembly. The output pinion 27 is placed at a position corresponding to the longitudinal middle point of the crankshaft 1. With the output pinion thus disposed at an intermediate position among mechanical elements of the speed change device according to the present invention, a differential gear means comprising gears 28, 29, 30, 31, and 32 can be placed at about the middle of the wheels (not shown) on both sides of the vehicle. Accordingly, both side axles 33, and 34 can be made in about the same length. With the aforesaid variety of modifications, a most suitable layout can be worked out for various combinations of vehicle bodies, engines, and other vehicle parts of wide range of dimensions.

Figure 11:
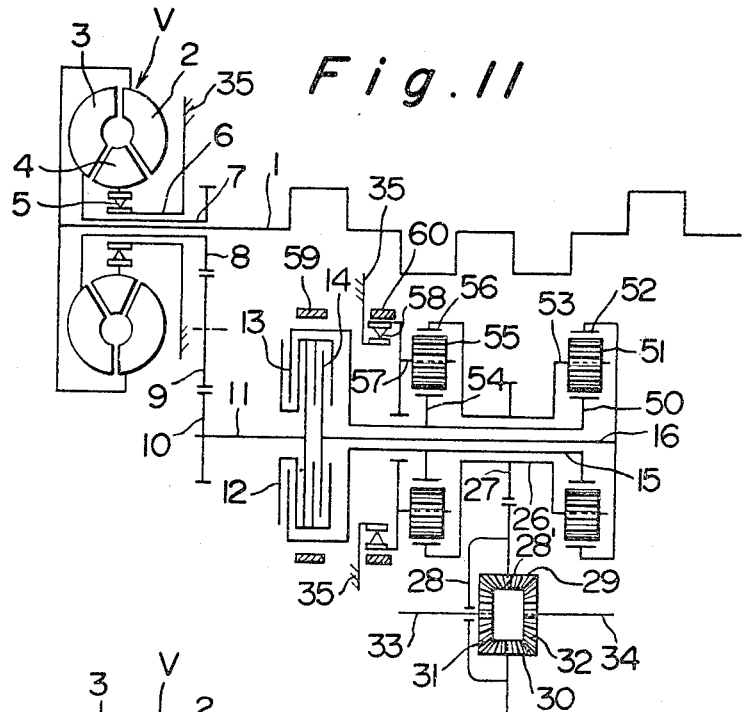
FIGS. 11 to 13 are skeleton diagrams illustrating different forms of the third embodiment of the invention, in which two units of simple planetary gear assemblies are utilized.

FIG. 11 shows a third embodiment of the present invention, in which two units of simple planetary gear assemblies are used. The input portion of the power transmission route from a crankshaft 1 to first and a second clutch of the third embodiment is identical with the corresponding portion of the first and second embodiment of the present invention, and hence, detailed explanation of the input portion of this embodiment will not be repeated hereinafter.

The first clutch 12, 14 is connected to the internal gear 52 of a first simple planetary gear assembly through a shaft 16, and the second clutch 12, 13 is connected to sun gears 50 and 54 of the first and a second simple planetary gear assemblies through a hollow shaft 15, which hollow shaft 15 is adapted to revolve around the shaft 16.

The first simple planet gear assembly comprises a sun gear 50 secured to the hollow shaft 15, planet gears 51, an internal gear 52 secured to the shaft 16, and a carrier 53 supporting said planet gears 51 in a rotatable manner. The planet gears 51 are meshed with both the sun gear 50 and the internal gear 52, and they are adapted to turn around the axis of the first planet gear assembly in a coaxial manner. The second simple planet gear assembly comprises a sun gear 54 secured to the hollow shaft 15, an internal gear 56 bonded to the carrier 53 of the first simple planetary gear assembly through a hollow shaft 26, planet gears 55 meshed with both the sun gear 54 and the internal gear 56, and a carrier 57 supporting said planet gears 55 in a rotatable manner. The planet gears 55 of the second simple planetary gear assembly are adapted to turn around the axis of the second simple planet gear assembly in a coaxial manner.

As shown in FIG. 11, the sun gears 50 and 54 of the first and second simple planet gear assemblies are bonded together by a hollow shaft 15 connected to the second clutch 12, 13 so that both sun gears rotate as an integral body when the second clutch is engaged. An output pinion 27 is secured to the other hollow shaft 26 connected to both the internal gear 56 of the second simple planetary gear assembly and the carrier 53 of the first planetary gear assembly, so that the output pinion 27 revolves integrally with the hollow shaft 26.

A one-way brake 58 mounted on a casing 35 of the speed change device is adapted to allow rotation of the carrier 57 of the second simple planetary gear assembly in the normal direction only, but to hold the carrier 57 stationary when the carrier 57 tends to revolve in the opposite direction. A brake 59 acts to stop the sun gears 50 and 54 by stopping the hollow shaft 15 on which the sun gears are secured, while another brake 60 acts to stop the carrier 57, when such brakes are actuated. These brakes can be of band brake type, cone clutch type, multiplate clutch type, or the like, and they should be capable of holding the aforesaid rotary members stationary with respect to the casing 35 of the speed change device.

The output pinion 27 is meshed with a reducing gear wheel 28, which actuates a differential gear means including gears 29, 30, 31, and 32. The manner in which the power on the turbine 3 is delivered to the both side axles 33 and 34 is identical with the corresponding power transmission in the first and second embodiments as described in detail hereinbefore referring to FIGS. 1 and 6, respectively. Hence, the details of such output portion of the power transmission mechanism in the third embodiment will not be repeated here.

Prior to entering into the detailed description of the operative conditions of each brake and each clutch, power transmission routes, and the speed change ratios for each operative stage of the speed change device, the symbols to be used in the following description and the relations between revolving speeds of various rotary members will now be explained. If it is assumed that the revolving speed of the internal gear 52, the sun gear 50, and the carrier 53 of the first simple planetary gear assembly are represented by $R_{31}$, $S_{31}$, and $C_{31}$, respectively, and the corresponding revolving speeds of the internal gear 56, the sun gear 54, and the carrier 57 of the second simple planetary gear assembly are represented by $R_{32}$, $S_{32}$, and $C_{32}$, respectively, then there are following relations between such revolving speeds.

$$(l_{31}+l)C_{31}=l_{31}R_{31}+S_{31} \quad (\alpha)''$$
$$(l_{31}+l)C_{32}=l_{32}R_{32}+S_{32} \quad (\beta)''$$
$$C_{31}=R_{32} \quad (\gamma)$$
$$S_{31}=S_{32}=S_3 \quad (\delta)$$

Here, $$l_{31}=\frac{\text{(pitch circle radius of the internal gear 52)}}{\text{(pitch circle radius of the sun gear 50)}}$$

$$l_{32}=\frac{\text{(pitch circle radius of the internal gear 56)}}{\text{(pitch circle radius of the sun gear 54)}}$$

As will be described in detail hereinafter, in the case of forward stage operation, the first clutch 12, 14 is engaged, so that the power on the turbine 3 is transmitted to the internal gear 52 of the first planetary gear assembly through the transmission shaft 16, while in the case of rearward operation, the second clutch 12, 13 is engaged, and the power on the turbine 3 is transmitted to sun gears 50 and 54 through the hollow shaft 15. The output power is delivered, in either operation, to the bonded combination of the carrier 53 and the internal gear 56. Thus, the speed change ratio can be defined by $R_{31}/C_{31}$ (or $R_{31}/R_{32}$) in the case of the forward operation, while the speed change ratio for the rearward operation can be given by $S_3/C_{32}$ (or $S_3/C_{31}$). The expression in the parenthesis is due to the relation of $C_{31}=R_{32}$.

If it is further assumed that the pitch circle radii of the transmission gears 8 and 10 are identical, then the values of $S_3$ and $R_{31}$ will become the same as the revolving speed of the turbine 3. Furthermore, due to the fact that the revolving speed of the output pinion 27 is the very revolving speed of the carrier 53 and the internal gear 56, each of the aforesaid speed change ratios $R_{31}/C_{31}$ and $S_3/C_{31}$ becomes the speed change ratio between the turbine 3 and the output pinion 27. By substituting zero to the revolving speed of that rotary member which is held stationary during each operative stage in the aforesaid Formulae $\alpha''$, $\beta''$, $\gamma$, and $\delta$, the speed change ratios for each of such stages of operation can be determined.

The operative conditions in each operative stage of the speed change device as illustrated in FIG. 11 will now be described. As the numeral example of the speed change ratio calculation in the succeeding description, it has been assumed that $l_{31}=l_{32}=2.4$.

NEUTRAL STAGE

Both the first and the second clutches are disengaged, while the brakes are either actuated or not actuated. Under these conditions, the clutch body 12 idles, and the power on the turbine 3 cannot be transmitted any further than the clutch body 12.

FORWARD FIRST STAGE

The first clutch 12, 14 is engaged. Under these conditions, the power on the turbine 3 is transmitted to the internal gear 52 of the first planetary gear assembly. The carrier 57 of the second simple planetary gear assembly tends to be rotated in the non-normal direction due to the friction between the driving wheel of the vehicle and the road surface, however, the one-way brake 58 acts to hold the carrier 57 stationary against such tendency. By substituting the relation of $C_{32}=0$ into the Formulae $\alpha''$, $\beta''$, $\gamma$, and $\delta$, the speed change ratio $m$ for this stage can be determined as follows.

$$m=R_{31}/C_{31}=(l_{31}+l_{32}+1)/l_{31}=2.42$$

In other words, the output pinion 27 revolves at a speed slower than the revolving speed of the internal gear 52 of the first simple planetary gear assembly. The power on the output pinion 27 is further delivered to the reducing gear wheel 28 at a reduced speed, and then further to drive wheels (not shown) of the vehicle through the both side drive axles 33 and 34, which are connected to the differential gear assembly.

FORWARD SECOND STAGE

The forward clutch 12, 14 is engaged and the brake 59 is actuated. Under these conditions, the power on the turbine 3 is delivered to the internal gear 52 of the first simple planetary gear assembly, as in the case of the forward first stage, and sun gears 50 and 54 are held stationary by means of the brake 59. By substituting the condition of $S_{31}=0$ to the Formula $\alpha''$, the speed change ratio $m$ for this operative stage can be determined as follows.

$$m=R_{31}/C_{31}=(l_{31}+1)/l_{31}=1.42$$

In this case, the output pinion 27 revolves also at a speed slower than that of the internal gear 52 of the first simple planetary gear assembly. The power transmission route from the output pinion 27 to the drive wheels is identical with that of the forward first stage, and hence no detail explanation thereof in this and the succeeding operative stages will be repeated here.

FORWARD THIRD STAGE

Both the first clutch 12, 14 and the second clutch 12, 13 are engaged simultaneously, while no brake is actuated. In this case, the power on the turbine 3 is delivered to the sun gears 50 and 54 simultaneously. By substituting the relation of $S_{31}=R_{31}$ to the Formula $\alpha''$, the speed change ratio $m$ for this operative stage can be determined as follows.

$$m = R_{31}/C_{31} = 1$$

In other words, the entire planetary gear assembly and the output pinion 27 are rotated as an integral body at the same revolving speed.

REARWARD STAGE

The second clutch 12, 13 is engaged and the brake 60 is actuated. Under these conditions, the power on the turbine 3 is transmitted to the sun gear 54 through the clutch 12, 13 and the hollow shaft 15. At the same time, the carrier 57 is held stationary by means of the brake 60. By substituting the relation of $C_{32}=0$ to the Formula $\beta''$, the speed change ratio for this stage can be determined as follows.

$$m = S_{32}/R_{32} = -l_{32} = -2.4$$

In other words, the output pinion 27 is rotated at a reduced speed in the rearward direction.

The operative conditions of each clutch and brake in each operative stage of the speed change device as illustrated in FIG. 11 can be summarized as shown in Table III.

TABLE III

| Operative stage | Forward 1st stage | Forward 2d stage | Forward 3d stage | Rearward stage |
|---|---|---|---|---|
| First clutch (12, 14) | Engaged | Engaged | Engaged | Disengaged. |
| Second clutch (12, 13) | Disengaged | Disengaged | do | Engaged. |
| Brake (59) | Not actuated | Actuated | Not actuated | Not actuated. |
| Brake (60) | (Actuated) | Not actuated | do | Actuated. |
| One-way brake (58) | Actuated | do | do | Not actuated. |
| Speed Change ratio ($m$): | | | | |
| Formula | $l_{31}+l_{32}+1/l_{31}$ | $l_{31}+1/l_{31}$ | 1 | $-l_{32}$. |
| Example: $l_{31}=l_{32}=2.4$ | 2.42 | 1.42 | 1 | $-2.4$. |

Note: In Table III, the reason for parenthesizing the "actuated" condition of the brake 60 in the forward first stage is as follows.

In the normal running of the vehicle with the speed change device operated at the forward first stage, carrier 57 is apt to be rotated in the non-normal direction by the friction between the tire and the road surface, but such tendency is effectively suppressed by the one-way brake 58. When engine brake is applied, for instance for the purpose of controlling the travelling speed of a vehicle while descending along a slope, there is produced such a torque on the output pinion 27 which tends to accelerate rotation of the carrier 57 in the normal direction. Since the one-way brake 58 is not effective in hindering the rotation of the carrier in the normal direction, in order to make the engine brake effective, it is preferable to actuate the brake 60 to withhold the carrier 57 securely.

Thus, the desired engine brake can be applied while maintaining the first speed change ratio.

Figure 12:
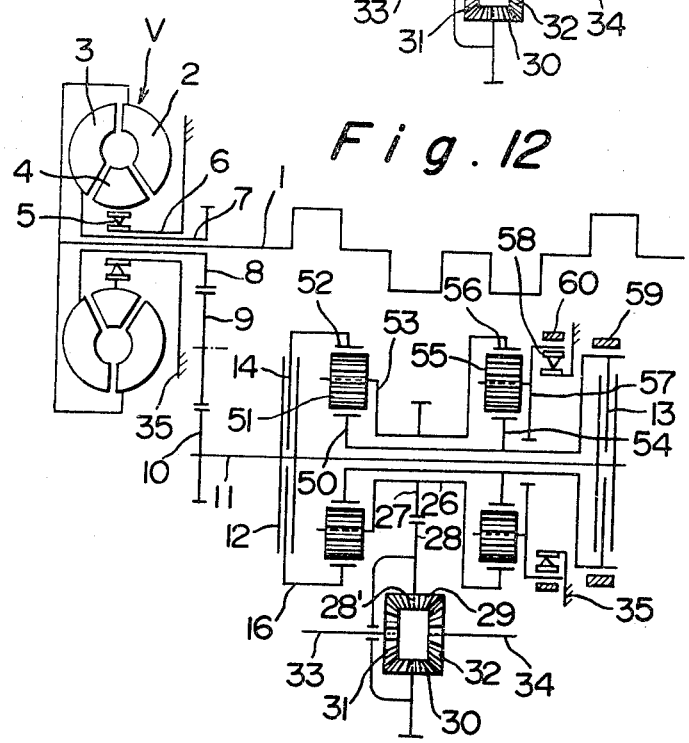

FIG. 12 shows a modification of the third embodiment as shown in FIG. 11, in which the second clutch 12, 13 is separated from the first clutch 12, 14 and located at the opposite side of the planetary gear assemblies. The operative principles of the speed change device of FIG. 12 are identical with those as described in detail referring to FIG. 11, and hence, the conditions of Table III are also applicable to this modification. The advantage of this modification is in the fact that the torque converter V can be connected to the right hand end of the crankshaft 1, as viewed in FIG. 12, so that the driving torque can be delivered to the planetary gear assemblies from the right hand end of the input shaft 11, even though the example of FIG. 12 has a torque converter connected to the extreme left end of the crankshaft 1.

Figure 13:
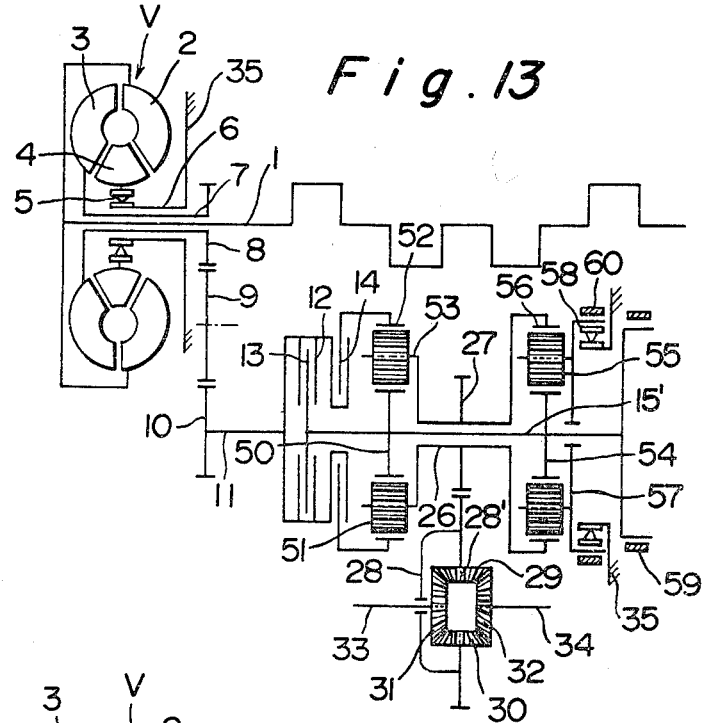

FIG. 13 illustrates another modification of the third embodiment as shown in FIG. 11, in which the interrelation between the two simple planetary gear assemblies is such that a transmission shaft connected to a second clutch plate 13 is extended through the axis of the planetary gear assemblies, and hence the shaft 15 can be made as a solid shaft. In the preceding examples, the shaft 15 is a hollow shaft having a large diameter. The operative principles of this modification are the same as those of the third embodiment as shown in FIG. 11, and hence, the conditions of Table III are also applicable to the device of FIG. 13. The advantage of this modification is in the fact that the diameter of a hollow shaft 26 connecting a carrier 53 with an internal gear 56 can be reduced because it is mounted directly on a solid shaft 15, while it was mounted on another hollow shaft in the preceding examples. Accordingly, it is also possible to use a smaller pitch circle for the output pinion 27 than that in the preceding examples as shown in FIGS. 11 and 12. This modification has another advantage in the structural arrangement of the speed change device, namely the clutches 12, 13 and 12, 14 can be grouped together at the left hand side of the simple planetary gear assemblies, while the other frictional elements including the one-way brake 58 and brakes 59 and 60 can be collected at the right hand side thereof.

Figure 14:
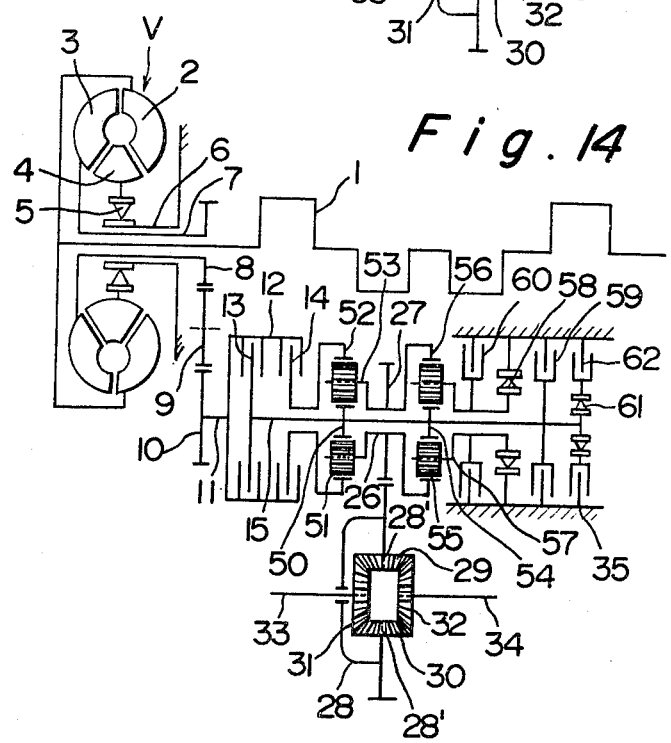
FIG. 14 is a view similar to FIG. 13, showing a fourth embodiment of the invention.

FIG. 14 shows a fourth embodiment of the present invention, which is similar to the preceding example as shown in FIG. 13 except that an additional one-way brake 61 and an extra brake 62 are provided on the transmission shaft 15. The purpose of the additional one-way brake 61 and the brake 62 is to ensure smooth shift from the forward second stage to the forward third stage of operation.

To illustrate the use of the one-way brake 61, the function of the one-way brake 58 will be reviewed. In shifting from the forward first to the forward second stages of the operation, sun gears 50 and 54, which rotate in the non-normal direction in the forward first stage, are going to be stopped by the actuation of a brake 59, and at the same time, a carrier 57, which is held stationary in the forward first stage by the one-way brake 58, is going to start rotating in the normal direction. The start of the normal rotation of the carrier 57 should be in synchronism with the stoppage of the sun gear 50 and 54, and in fact, such synchronization is achieved easily by using the one-way brake 58 allowing the free rotation of the carrier 57 in the normal direction. If the device 58 were not a one-way brake but a two-way brake, the operation of such imaginary brake should be properly synchronized with that of the brake 59. In the actual operation, such proper synchronism cannot necessarily be achieved with ease, and the shift from the first to the second operative stages tends to be uneven. Thus, with the use of the one-way brake 58, the smooth shift between the first and second stages is ensured.

In the fourth embodiment of the invention, it is intended to achieve such smooth shift in the case of the change-over from the forward second to the forward third stages of operation. The operative conditions of each clutch and brake of the speed change device of FIG. 14 are shown in Table IV.

TABLE IV

| Operative stage | Forward 1st stage | Forward 2d stage | Forward 3d stage | Rearward stage |
|---|---|---|---|---|
| First clutch (12, 14) | Engaged | Engaged | Engaged | Disengaged. |
| Second clutch (12, 13) | Disengaged | Disengaged | do | Engaged. |
| Brake (59) | Not actuated | (Actuated) | Not actuated | Not actuated. |
| Brake (60) | (Actuated) | Not actuated | do | Actuated. |
| Brake (62) | Not actuated | Actuated | do* | Not actuated. |
| One-way brake (58) | Actuated | Not actuated | do | Do. |
| One-way brake (61) | Not actuated | Actuated | do | Do. |

Note: The parenthesized expression of (actuated) in Table IV represents the fact that the related brakes are actuated under the condition of engine brake application. The asterisk mark (*) represents that it is permissible to actuate the related brake.

In comparison of Table III and IV, it is apparent that with the construction of the fourth embodiment of the invention, to run the speed change device of FIG. 14 at the forward second stage, the brake 62 is actuated instead of the brake 59, which brake is actuated in the forward second stage in the case of examples shown in FIGS. 11 to 13. The shift from the forward second to the forward third stages of operation of the speed change device can be carried out smoothly in the following fashion.

In the forward second stage, the sun gears 50 and 54, which tend to rotate in the non-normal direction due to the friction between the driving wheels of a vehicle and the road surface, are held stationary by means of the one-way brake 61, while the carrier 57 rotates at a reduced speed. As the rearward brake 12, 13 is engaged to shift the speed change device into the forward third stage, the sun gears 50 and 54 start rotating in the normal direction at a gradually increasing speed, and at the same time the revolving speed of the carrier 57 is also gradually increased. In this process of shifting, there is no need of adjustment for synchronizing the actuation of the rearward clutch 12, 13 with release of a related brake, because the one-way brake 61 allows, by nature, the free rotation of the sun gears 50 and 54 in the normal direction.

FIG. 15 shows a partial sectional view of the actual arrangement of a speed change device according to the principles as described hereinbefore referring to FIG. 14, showing a portion between the input shaft 11 and the output pinion 27 coupled with the gear wheel 28. Referring to the figure, a carrier 53 of one of the two simple planetary gear assemblies is connected to an internal gear 56 of the other simple planetary gear assembly by splining through a connecting member 64. An output pinion 27 is splined to the carrier 53. Thus, the carrier 53, the internal gear 56, and the output pinion 27 are rotated together as an integral body. Antifriction bearings 63 are provided on both sides of the output pinion 27 to bear the reactional force and thrust force transmitted from the reducing gear wheel 28.

In this particular arrangement, the sun gear 50 of one simple planetary gear assembly is splined to a transmission shaft 15 bonded to a second clutch plate 13, while the sun gear 54 of the other simple planetary gear assembly is made as in integral part of the transmission shaft 15. The internal gear 52 is connected to a first clutch plate 14 through a connecting member 14'. The carrier 57 is rotatably mounted on the transmission shaft 15 of the speed change device, and there are provided a brake 60 and a one-way brake 58 between the carrier 57 and the casing 35. Toward the extreme right end of the transmission shaft 15, as seen in FIG. 15, there are provided a brake 59, a one-way brake 61, and another brake 62 disposed between the shaft 15 and the casing 35 of the speed change device. In the figure, the reference numeral 100 designates a ball bearing to support an assembly of the output pinion 27, the carrier 53 and the internal gear 56 on the casing 35 of the speed change device, and 101 and 102 are spring means to control actuation of the clutch means in conjunction with fluid pressure delivered through fluid passageway 103. The reference numeral 104 represents piston rings.

As described in the foregoing referring to different embodiments and modifications of the present invention, the output power of the speed change device is ultimately transmitted to drive axles 33, 34, which are disposed in parallel with the common axis of the planetary gear assemblies, clutches, and brakes. Moreover, both said common axial center line and the drive axles are arranged in parallel with the axis of the crankshaft 1 of the driving engine. Such arrangement of the speed change device is particularly advantageous for lateral layout of the engine in a front-engine front-drive type vehicle or a rear-engine rear-drive type vehicle.

In the third and fourth embodiments of the invention, the output pinion 27 is disposed at an intermediate position between the first and second simple planetary gear assemblies. With the output pinion 27 thus disposed between two sets of planetary gear assemblies, it is made easy to place a reducing gear wheel 28 and a differential gear means comprising gears 29, 30, 31, and 32 at about the middle of both side drive wheels (not shown) of a vehicle. Accordingly, the drive axles 33 and 34 to be disposed at both sides of the vehicle can be made in substantially the same length.

With the aforesaid variety of modifications, it is always possible to select the most suitable layout of speed change device for each particular structure of vehicle, which structure is determined by the dimensions of the vehicle body, engines and other accessories thereof. Thus, the optimum efficiency of the speed change device and the most economical layout of the power transmission system of a vehicle can be achieved.

What we claim is:

1. A speed change device for vehicles, comprising, in combination, a torque converter connected to one end of the crankshaft of an engine for driving the vehicle; a first clutch and a second clutch driven by said torque converter; a planetary gear assembly means selectively engageable with said first and second clutches, said planetary gear assembly consisting of a first sun gear connected to said first clutch, a second sun gear connected to said second clutch, an internal gear, a plurality of first planet gears meshed with said first sun gear, a plurality of second planet gears meshed with said second sun gear, said second planet gears further meshed with both said first planet gears and said internal gear, and a carrier supporting said first and second planet gears in a rotatable manner; an output gear bonded to said internal gear; and brake means consisting of a first brake capable of stopping said second sun gear, a second brake capable of stopping said carrier, and a one-way brake allowing said carrier to rotate in a predetermined direction but not in the opposite direction; axes of rotation of said clutches, said planetary gear assembly means, said brake means, and said output gear being disposed in alignment with a common axis which is parallel with the axis of said crankshaft, said output gear being located at a position on said common axis which substantially corresponds to the longitudinal middle point of said crankshaft.

2. A speed change device according to claim 1, wherein said first and second clutches are located intermediate between said torque converter and said planetary gear assembly; said first brake is mounted in the proximity of said second clutch; and said one-way brake and said second brake are moutned on the casing of the speed change device on that end of the planetary gear assembly which is opposite to said torque converter.

3. A speed change device according to claim 1, wherein said first and second clutches are disposed separately on opposite sides of said planetary gear assembly, and said output gear is located between said planetary gear assembly and said second clutch, said second clutch being positioned between said planetary gear assembly and said torque converter; said first brake is mounted in the proximity of said second clutch; and said one-way brake and said second brake are mounted on the casing of the speed change device on that end of the planetary gear assembly which is opposite to said torque converter.

4. A speed change device according to claim 1, wherein said first and second clutches are disposed separately on opposite sides of said planetary gear assembly, said second clutch being positioned between said planetary gear assembly and said torque converter, said output gear being located between said planetary gear assembly and said first clutch; and said first brake is mounted in the proximity of said second clutch.

5. A speed change device according to claim 1, wherein said output gear mounted to said internal gear is disposed between said planetary gear assembly and said first and second clutches, said first and second clutches being located intermediate between said torque converter and said planetary gear assembly; and said one-way brake and said first and second brakes are mounted on that side of the planetary gear assembly which is opposite to said torque converter.

References Cited

UNITED STATES PATENTS

| | | | |
|---|---|---|---|
| 643,130 | 2/1900 | Heermans | 74—695 |
| 1,125,140 | 1/1915 | Lucke | 74—701 X |
| 2,725,762 | 12/1955 | Hettinger, et al. | 74—688 |
| 2,919,604 | 1/1960 | De Lorean | 74—688 X |
| 3,025,721 | 3/1962 | De Lorean | 74—688 |
| 3,029,662 | 4/1962 | Hause | 74—668 X |
| 3,209,617 | 10/1965 | Kalversberg | 74—688 |
| 3,246,542 | 4/1966 | Moan | 74—688 X |
| 3,270,585 | 9/1966 | Livezey | 74—688 X |
| 3,300,001 | 1/1967 | Stockton | 74—763 X |
| 3,314,307 | 4/1967 | Egbert | 74—688 |

ARTHUR T. McKEON, Primary Examiner

U.S. Cl. X.R.

74—688, 701